April 14, 1964 R. A. KAENEL 3,129,342

SQUARING CIRCUIT UTILIZING TWO NEGATIVE RESISTANCE DIODES IN SERIES

Filed Aug. 10, 1961 2 Sheets-Sheet 1

INVENTOR
R. A. KAENEL
BY Lucian C. Canepa
ATTORNEY

April 14, 1964
R. A. KAENEL
3,129,342
SQUARING CIRCUIT UTILIZING TWO NEGATIVE RESISTANCE DIODES IN SERIES
Filed Aug. 10, 1961
2 Sheets-Sheet 2

INVENTOR
R. A. KAENEL
BY Lucian C. Canepa
ATTORNEY

United States Patent Office 3,129,342
Patented Apr. 14, 1964

3,129,342

SQUARING CIRCUIT UTILIZING TWO NEGATIVE RESISTANCE DIODES IN SERIES

Reginald A. Kaenel, Murray Hill, N.J., assignor to Bell Telephone Laboratories, Incorporated, New York, N.Y., a corporation of New York Filed Aug. 10, 1961, Ser. No. 130,608
1 Claim. (Cl. 307—88.5)

Figure 1:
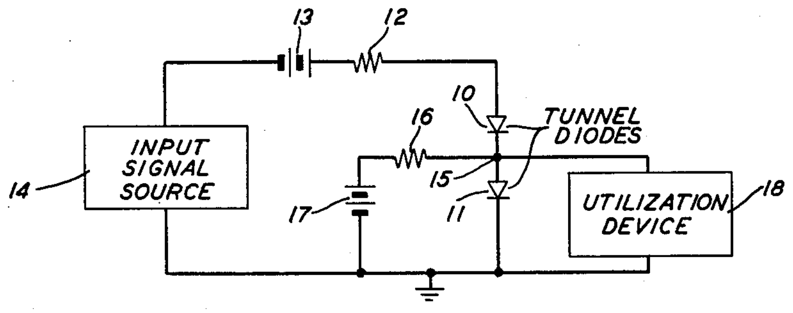

This invention relates to signal translating circuits, and more particularly to a substantially hysteresis-free squaring circuit employing voltage-controlled negative resistance diodes.

A squaring circuit responds to various types of input waveshapes applied thereto to provide square wave outputs. Specifically, the output waveform of a squaring circuit is independent of input amplitude and may have much faster leading and trailing edges than the input waveform. Such circuits are useful, for example, to perform pulse retiming or reshaping functions in repeaters and terminal equipment.

One well-known type of squaring circuit is described on pages 164–168 of "Pulse and Digital Circuits," J. Millman et al., McGraw-Hill Book Company, 1956. This circuit exhibits hysteresis or backlash. In other words, the value of the input waveform at which triggering of the circuit occurs depends upon whether the input waveform is increasing or decreasing. In many applications requiring a squaring circuit hysteresis is an undesirable characteristic, for it limits the amplitude discriminating properties of the circuit and causes the output waveform thereof to deviate from perfect squareness.

An object of the present invention is the improvement of signal translating circuits, particularly squaring circuits.

Another object of this invention is a substantially hysteresis-free squaring circuit which is characterized by high speed, low power dissipation, high reliability and extreme simplicity of design.

These and other objects of the present invention are realized in a specific illustrative squaring circuit embodiment thereof which includes two negative resistance diodes of the voltage-controlled type connected in series-aiding. Connected in series with the diodes is a source for biasing each of them at a point on the relatively low voltage positive resistance region of its characteristic curve. Another source is connected in parallel with the lower diode to cause sufficient additional current to flow therethrough to bias the lower diode at approximately the peak point of its characteristic curve at a current value that is higher than that which corresponds to the operating point of the upper diode. An input signal source is connected in series with the diodes and thus also in series with the first-mentioned source, and a utilization device or output circuit is connected in parallel with the lower diode.

The application to the diodes of an extremely small increment of current from the input signal source causes the operating point of the lower diode to switch rapidly from the peak point of its characteristic curve to a point on the relatively high voltage positive resistance region thereof, whereby the voltage applied to the utilization device undergoes a very rapid transition from a relatively low to a relatively high value. When the voltage across the lower diode switches to a relatively high value, the current through the lower diode assumes a value that is less than that which flows through the upper diode.

As the input signal increases in amplitude, the upper diode also eventually switches to the relatively high voltage positive resistance region of its characteristic curve to a point whose corresponding current value is greater than the current value corresponding to the operating point of the lower diode. Then, as the amplitude of the applied input signal decreases toward a zero volts reference level, the operating points of the two diodes move downward on the relatively high voltage positive resistance regions of their characteristic curves toward the valley points thereof with the operating point of the lower diode leading the way.

At the time that the waveform of the input signal intersects the reference level thereof, the operating point of the lower diode coincides approximately with the valley point of its characteristic curve. Subsequently, as the input signal waveform crosses below the reference level by an extremely small amount, the lower diode switches rapidly from the valley point to a point on the relatively low voltage positive resistance region of its characteristic curve, whereby the voltage applied to the utilization device undergoes a very rapid transition from a relatively high to a relatively low value. When the voltage across the lower diode switches to a relatively low value, the current through the lower diode again assumes a value that is greater than that which flows through the upper diode.

As the input signal decreases further in amplitude, the upper diode also eventually switches to the relatively low voltage positive resistance region of its characteristic curve to a point whose corresponding current value is less than the current value corresponding to the operating point of the lower diode. Then, as the amplitude of the applied input signal increases toward its reference level, the operating points of the two diodes move upward on the relatively low voltage positive resistance regions of their characteristic curves toward the peak points thereof with the operating point of the lower diode again leading the way. Finally, when the waveform of the input signal again intersects the zero volts reference level, the operating point of the lower diode coincides approximately with the peak point of its characteristic curve and conditions are set for another complete cycle of operation of the illustrative embodiment.

Thus, in approximate time coincidence with an extremely slight deviation of the input signal waveform in a positive direction from its reference level, the voltage applied to the utilization device switches from a relatively low to a relatively high voltage value. At a later time, in approximate time coincidence with an extremely slight deviation of the input signal waveform in a negative direction from its reference level, the voltage applied to the utilization device switches from a relatively high to a relatively low value, remaining there until a subsequent positive input current increment causes the voltage thereacross to switch to a relatively high value.

It is a feature of the present invention that a squaring circuit include two negative resistance diodes of the voltage-controlled type connected in series-aiding.

It is another feature of this invention that a squaring circuit include two series-aiding voltage-controlled negative resistance diodes connected to an arrangement which initially biases one of the diodes at approximately the peak point of its characteristic curve and the other one at a point on the relatively low voltage positive resistance region of its characteristic curve below the peak point thereof.

It is still another feature of the present invention that a squaring circuit include two series-aiding voltage-controlled negative resistance diodes connected to an arrangement which initially biases one of the diodes at approximately the peak point of its characteristic curve and the other one at a point on the relatively low voltage positive resistance region of its characteristic curve below the peak point thereof, an input signal source connected in series with the diodes, and a utilization device connected in parallel with the diode that is initially biased at the peak point.

Figure 2A:
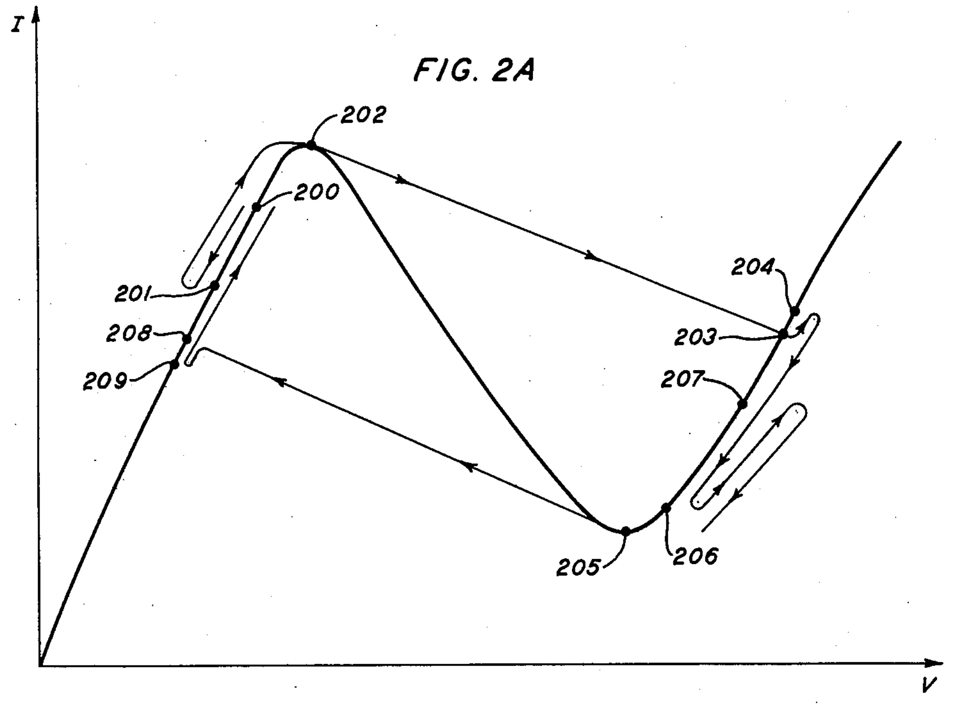
Figure 2B:
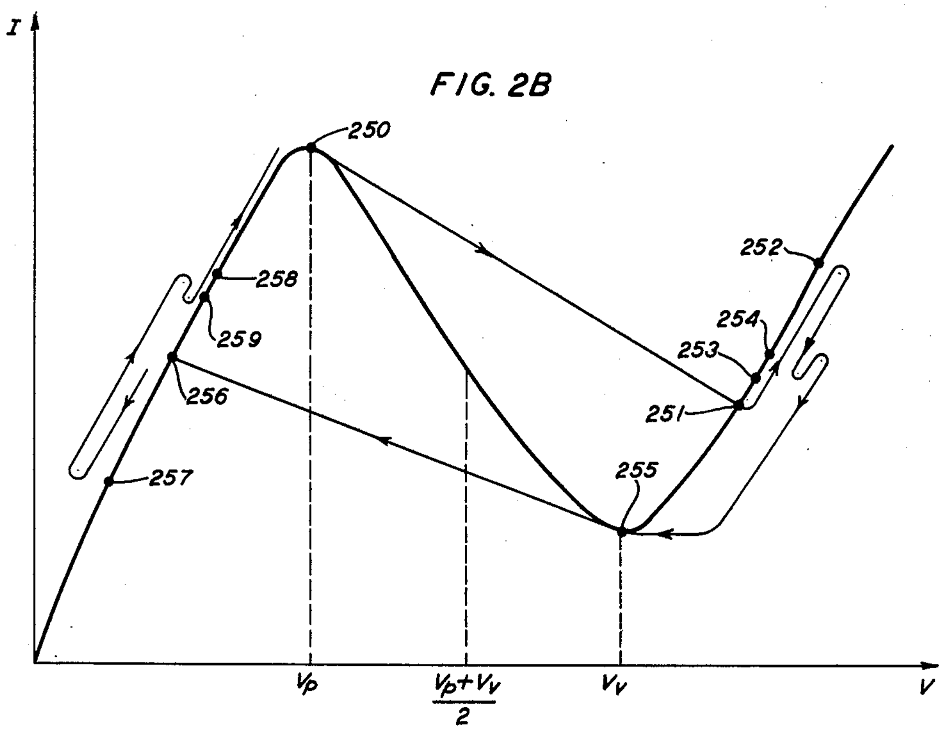
Figure 3:
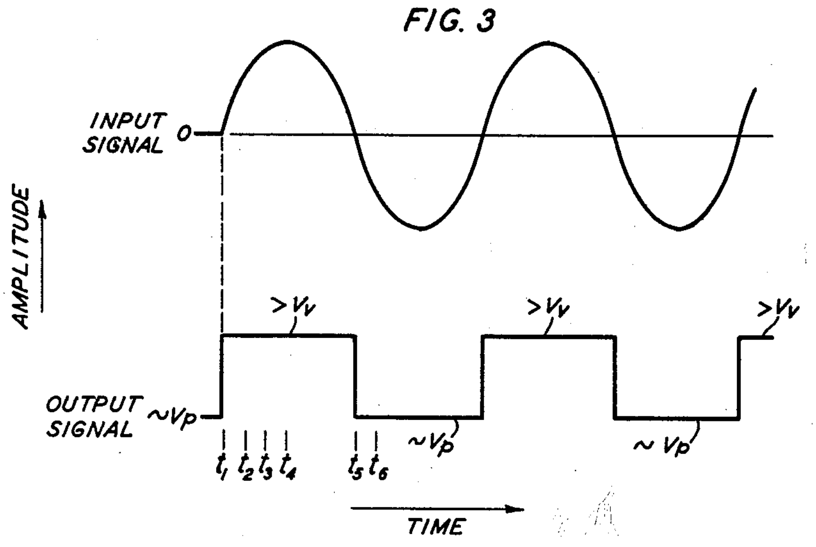

A complete understanding of the present invention and of the above and other features and advantages thereof may be gained from a consideration of the following detailed description of an illustrative embodiment thereof presented hereinbelow in connection with the accompanying drawing, in which:

FIG. 1 depicts a squaring circuit which illustratively embodies the principles of the present invention;

FIGS. 2A and 2B respectively illustrate the voltage-current characteristic curves of the upper and lower series-aiding diodes shown in FIG. 1 and, further, illustrates the switching action that the diodes undergo in response to an input signal; and FIG. 3 shows input and output waveforms characteristic of the illustrative circuit depicted in FIG. 1.

A great variety of electronic devices and circuits exhibit negative resistance characteristics and it has long been known that such negative resistance characteristics may have one of two forms. The N-type negative resistance, which is referred to as open-circuit stable (or short-circuit unstable, or current-controlled) is characterized by zero-resistance turning points. The S-type negative resistance, which is referred to as short-circuit stable (or open-circuit unstable, or voltage-controlled) is the dual of the N-type and is characterized by zero-conductance turning points. The thyratron and dynatron are vacuum tube examples of devices which respectively exhibit N- and S-type negative resistance characteristics.

Illustrative embodiments of the principles of the present invention include negative resistance diodes of the voltage-controlled type. One highly advantageous example of this type of two-terminal negative resistance arrangement is the so-called tunnel diode. Tunnel diodes are described in the literature: see, for example, "New Phenomenon in Narrow Germanium P-N Junctions," L. Esaki, Physical Review, volume 109, January-March 1958, pages 603–604; "Tunnel Diodes as High-Frequency Devices," H. S. Sommers, Jr.; Proceedings of the Institute of Radio Engineers, volume 47, July 1959, pages 1201–1206; and "High-Frequency Negative-Resistance Circuit Principles for Esaki Diode Applications," M. E. Hines, The Bell System Technical Journal, volume 39, May 1960, pages 477–513.

The tunnel diode comprises a p-n junction having an electrode connected to each region thereof, and is similar in construction to other semiconductor diodes used for such various purposes as rectification, mixing, and switching. The tunnel diode, however, requires two unique characteristics of its p-n junction; that it be narrow (the chemical transition from n-type to p-type region must be abrupt), of the order of 100 Angstrom units in thickness, and that both regions be degenerate (i.e., contain very large impurity concentrations, of the order of $10^{19}$ per cubic centimeter).

The tunnel diode offers many physical and electrical advantages over other two-terminal negative resistance arrangements. These advantages include: potentially low cost, environmental ruggedness, reliability, low power dissipation, high frequency capability, and low noise properties. Advantageously, then, the negative resistance diodes included in illustrative embodiments of the principles of the present invention are tunnel diodes.

Referring now to FIG. 1, there is shown a specific illustrative squaring circuit made in accordance with the principles of the present invention. The circuit includes two negative resistance diodes of the voltage-controlled type connected in series-aiding. Specifically, the circuit includes an upper diode 10 and a lower one 11 which are connected in series with a bias resistor 12 and a source 13 that is selected to be of a value to bias both diodes at stable operating points on the relatively low voltage positive resistance regions of their characteristic curves. Connected in series with the bias source 13 is an input signal source 14 which, for example, may apply to the diodes 10 and 11 a sine wave that is symmetrical with respect to a zero volts reference level. Specifically, the input signal waveform may be of the type depicted by the upper waveform of FIG. 3.

Connected in parallel with the lower diode 11 is a second resistor 16 and a second bias source 17. The voltage of the source 17 is selected to be approximately one-half of the sum of the peak and valley voltages of the diode 11, the peak and valley voltages thereof being designated in FIG. 2B by the symbols $V_P$ and $V_V$, respectively. Further, the value of the resistor 16 is selected such that the additional current flow through the diode 11 from the source 17 is sufficient to move the operating point of the diode 11 upwards on the relatively low voltage positive resistance region of its characterstic curve to the peak point 250 (FIG. 2B) thereof.

Thus, in the absence of an applied signal from the input source 14, the upper diode 10 is biased at a point 200 (FIG. 2A) on the relatively low voltage positive resistance region of its voltage-current characteristic curve and the lower diode 11 is biased at the peak point 250 of its characteristic curve, whereby the voltage applied to a utilization device 18 connected in parallel with the lower diode 11 is the relatively low voltage $V_P$.

Assume now that at the time marked $t_1$ in FIG. 3 the input signal applied from the source 14 to the diodes 10 and 11 starts to increase. In response to an extremely small such increase, the operating point of the lower diode 11 switches very rapidly from the peak point 250 to a point 251 on the relatively high voltage positive resistance region of its characteristic curve, whereby the voltage applied to the utilization device 18 changes very rapidly to a relatively high voltage level which exceeds the valley point voltage $V_V$, as indicated by the lower waveform of FIG. 3.

During the time in which the lower diode 11 switches from its quiescent point 250 to the relatively high voltage point 251, the operating point of the upper diode 10 shifts from its quiescent point 200 to a point 201 whose corresponding current value is higher than that corresponding to the point 251. This current relationship stems from the fact that only a portion of the current that flows through the upper diode 10 flows through the lower diode 11, the remainder thereof flowing through the resistor 16 toward the source 17. This, in turn, is due to the fact that the voltage of node point 15 (FIG. 1) exceeds the voltage of the source 17 whenever the lower diode 11 is in its relatively high voltage state.

It is significant to note that whenever the lower diode 11 is operating at a point on the relatively low voltage positive resistance region of its characteristic curve, the current therethrough is greater than that flowing through the upper diode 10. On the other hand, whenever the lower diode 11 is operating at a point on the relatively high voltage positive resistance region of its characteristic curve, the current therethrough is less than that flowing through the upper diode 10. Therefore, when both diodes are in their relatively low voltage states and are being shifted upward toward their peak points, the operating point of the lower diode 11 leads the way, thereby ensuring that the lower diode 11 is the first one to switch to its relatively high voltage state. Similarly, when both diodes are in their relatively high voltage states and are being shifted downward toward their valley points, the operating point of the lower diode 11 again leads the way, thereby ensuring that the lower diode 11 is the first one to be switched back to its relatively low voltage state.

Now, looking again in particular at FIGS. 2A, 2B and 3, as the amplitude of the signal applied from the input source 14 to the diodes 10 and 11 further increases, in the time interval designated $t_1$ through $t_2$ in FIG. 3, the operating point of the upper diode 10 moves upward on the relatively low voltage positive resistance region from the point 201 toward the peak point 202. During this same time, the operating point of the lower diode 11 moves upward on the relatively high voltage positive resistance region from the point 251 toward a point 252.

Eventually, at time $t_3$, the input waveform drives the operating point of the upper diode 10 over its peak point 202. As a result, the diode 10 switches to a point 203 on the relatively high voltage positive resistance region of its characteristic curve and at the same time the operating point of the lower diode 11 shifts from the point 252 to a point 253 whose corresponding current value is less than that corresponding to the point 203. Then, as the amplitude of the input waveform increases further to its maximum amplitude, which is reached at time $t_4$ the operating point of the upper diode 10 shifts from the point 203 to a higher voltage point 204 and the operating point of the lower diode 11 shifts from the point 253 to a higher voltage point 254.

Subsequently, as the amplitude of the input waveform begins to decrease toward its zero volts reference level, the operating point of the upper diode 10 shifts downward from the point 204 toward the valley point 205, while the operating point of the lower diode 11 shifts downward from the point 254 toward the valley point 255. During this downward shifting, the operating point of the diode 11 leads the way, that is, the current therethrough is at all times less than that flowing through the upper diode 10. As a result, the operating point of the lower diode 11 reaches its valley point 255 before the operating point of the upper diode 10 reaches its valley point 205. Specifically, the operating point of the diode 11 reaches its valley point 255 at the time designated $t_5$ in FIG. 3, at which time the input waveform reaches its reference or zero volts level. At this time, the operating point of the upper diode 10 has moved down to a point 206.

Therefore, at approximately the time designated $t_5$, an extremely small negative excursion of the input signal causes the lower diode 11 to switch past its valley point 255 to a point 256 on the relatively low voltage positive resistance region of its characteristic curve, thereby causing the voltage applied to the utilization device 18 to change at about time $t_5$ to a value which is slightly less than the peak voltage $V_P$. During this time, the operating point of the upper diode 10 shifts from the point 206 to a higher current point 207. Then, as the amplitude of the input signal continues to decrease, the operating point of the diode 10 shifts downward from the point 207 and the operating point of the diode 11 shifts downward from the point 256. Finally, at time $t_6$, the operating point of the upper diode 10 switches past its valley point 205 to a point 208 on the relatively low voltage positive resistance region of its characteristic curve. At the same time the operating point of the lower diode 11 shifts upward from the point 257 to a point 258.

Subsequently, as the amplitude of the input waveform decreases further to its maximum negative value, the operating point of the diode 10 shifts downward from the operating point 208 to a lower voltage point 209, and the operating point of the diode 11 shifts downward from the point 258 to a lower voltage point 259. Then, as the amplitude of the input signal increases toward the zero reference level, the operating point of the diode 10 shifts upward from the point 209 toward its quiescent point 200 and that of the diode 11 shifts upward from the point 259 toward its quiescent point 250. Thus, as the input waveform reaches the zero reference level, the diodes 10 and 11 are respectively biased at the points 200 and 250 from which the complete cycle of operation just described originally commenced. Other identical cycles of operation may be easily followed through in a manner similar to that described in detail hereinabove.

Actually, the flat-topped and flat-bottomed portions of the output waveform shown in FIG. 3 will not be exactly horizontal, due to the fact that the voltage across the lower diode 11 does not remain at one particular value on each of the low and high voltage positive resistance regions of its characteristic curve, but, instead, as described above, shifts over a small range of voltage values on each of those regions. If a more nearly perfect square wave is desired, the output waveform from the circuit shown in FIG. 1 may simply be applied to a conventional clipping circuit to make the flat portions of the output waveform more nearly horizontal.

Of course, input waveforms other than the specific one depicted in FIG. 3 may be utilized to trigger the series-aiding diodes 10 and 11 to undergo a complete switching cycle of the general type described herein. For example, the zero crossings of the input signal waveform may be selected to produce either a symmetrical rectangular output waveform or an output waveform the duration of whose relatively high voltage intervals is not equal to the duration of the relatively low voltage intervals.

It is emphasized that although particular attention herein has been directed to the use of tunnel diodes as the series-aiding elements of each converter stage, other two-terminal voltage-controlled negative resistance arrangements having characteristics of the type shown in FIGS. 2A and 2B may also be used therefor.

Furthermore, it is to be understood that the above-described arrangements are only illustrative of the application of the principles of the present invention. Numerous other arrangements may be devised by those skilled in the art without departing from the spirit and scope of this invention.

What is claimed is:

In combination in a substantially hysteresis-free squaring circuit, two voltage-controlled negative resistance diodes connected in series-aiding, first constant value direct-current means connected in series with said diodes for biasing each of them at an operating point on the relatively low voltage positive resistance region of its characteristic curve below the peak point thereof, second constant value direct-current means including a voltage source having a value intermediate the voltage values respectively associated with the peak and valley points of said characteristic curve, said second direct-current means being connected in parallel with one of said diodes for causing sufficient additional current to flow therethrough to bias the one diode at its peak point under steady state conditions in the absence of an input signal being applied to said circuit, and input signal means connected in series with said diodes for applying thereto a bipolar signal whose positive amplitude is sufficient to drive the one diode and then the other diode to operating points on the relatively high voltage positive resistance regions of their respective characteristic curves and whose negative amplitude is sufficient to sequentially drive said diodes from said relatively high voltage operating points to respective operating points on the relatively low voltage positive resistance regions of their characteristic curves.

References Cited in the file of this patent

UNITED STATES PATENTS 3,040,190 Buelow ---------------- June 19, 1962

OTHER REFERENCES

IBM Technical Disclosure Bulletin, vol. 3, No. 10, March 1961, pages 74–75, Logic Circuitry, Mayeda.

Electronics, June 24, 1960, pages 103–107, by Chow.